INVENTOR.
Raymond E. Szupillo
BY
Walter S. Zebrowski
ATTORNEY

United States Patent Office 3,647,566
Patented Mar. 7, 1972

3,647,566
CHROMIUM FILMED GLASS ARTICLES AND METHOD FOR MAKING THE SAME
Raymond E. Szupillo, Painted Post, N.Y., assignor to Corning Glass Works, Corning, N.Y.
Filed Nov. 14, 1968, Ser. No. 775,860
Int. Cl. C23c 11/04, 11/00
U.S. Cl. 148—6.3                                17 Claims

ABSTRACT OF THE DISCLOSURE

Improved chromium film glass based articles having a low incidence of film surface defects, and highly hardened extremely scratch and wear resistant quality. The method includes the use of a substantially alkali-free glass substrate upon which is formed a chromium film, after which the composite so formed is heat treated to obtain the desired film hardness and electromagnetic energy reflective quality.

BACKGROUND OF THE INVENTION

Use has been made in the prior art of relatively soft chromium films on alkali containing glass substrates, bases, and plates for a variety of purposes. Due to their highly reflective surfaces, at least at optical wavelengths, high quality soft chromium films on glass make excellent mirrors. Another use of such films on glass includes a wide variety of decoratively patterned articles. Still another use includes masks of the type employed in the fabrication of solid state microcircuits by well known photosensitive resist techniques.

Unfortunately soft chromium films are not very durable and can easily be scratched, worn, and otherwise damaged during the ordinary processes of handling, use, transportation, and storage of articles made thereof. It is known that the durability of such films can be improved by hardening them in heat treatment processes at specific temperatures over selected time durations. In general, the higher the temperature employed for a given time duration in the heat treatment, the harder and more durable will be the chromium film as a result.

However, where chromium films are formed on glass, it has not been possible to harden them to a high degree by heat treatment because of the tendency of such films to form pinholes, surface blemishes, scratches, and other deformities as a result. It has been found that such deformities are a function of the maximum temperature employed during the heat treatment process. Moreover, the density of such deformities increases in an exponential manner with increasing maximum temperatures of heat treatment. For temperatures beyond about 350° C., the number of individual surface defects occurring in such films increases at a particularly alarming rate.

The number of defects due to heat treatment is also a function of the length of time of the heat treatment at the highest temperature employed, up to a point. It appears that for any given maximum heat treatment temperature employed, there is a certain minimum length of time required in order to complete all the oxide forming reactions that can occur on the chromium surface at that temperature. This length of time is said to be the minimum time of heat treatment required in order for equilibrium conditions to occur and has been found to be about two hours. Beyond this time duration, continued heat treatment at the same temperature will not result in an appreciably greater formation of oxides or in an appreciably harder and more durable film.

In producing hardened chromium films on glass by heat treatment, the maximum hardness that has been obtainable in the prior art has therefore depended upon the maximum incidence or density of surface deformities that could be tolerated, which in turn depended upon the film quality needed for a given application. For example, the maximum permissible pinhole density of a chromium mirror is likely to be much greater than that of a chromium microcircuit mask. Unfortunately, reusable masks which are subject to a great deal of handling should be very durable whereas articles such as wall mirrors which are rarely handled might not require such high durability. However, since pinhole density is directly related to hardness in chromium film-glass based articles of the prior art, maximum film durability has not been obtainable where high film quality has been required.

There is another problem encountered in fabricating microcircuit masks, where soft chromium films on glass are used. It is usually most desirable to etch a uniformly deposited chromium film on glass into an intricate microcircuit mask pattern by conventional photosensitive resist techniques. Many of the resists used in these techniques, such as Kodak Photo Resist and Kodak Ortho Resist, trade name products of the Eastman Kodak Company, Rochester, N.Y., hereinafter referred to as KPR and KOR, respectively, require exposure to ultraviolet light energy. To accomplish this, conventional mercury vapor arc lamps are often used. It so happens that one of the major ultraviolet spectral lines of energy emitted by such lamps is at 3650 A. wavelength, a wavelength for which both KPR and KOR are highly transparent. Unfortunately, soft chromium films are highly reflective with respect to this wavelength region of ultraviolet energy.

Consequently, when one of these resists is being selectively exposed to such energy in order to form a protective mask upon chromium so that the chromium can thereafter be etched to form a durable microcircuit mask, the energy filters through the exposed areas of the resist and is readily reflected off the underlying chromium at various angles back into the resist. Often this "backscatter" of 3650 A. energy off the chromium film causes exposure of the resist in regions that are meant to remain unexposed, with the result that the edge definition of the exposed resist is ragged and quite irregular. Upon etching the chromium, such edge definition will be transferred to the chromium mask itself, and such a chromium mask will produce very low quality microcircuits.

Soft chromium filmed glass based microcircuit masks such as described above have been formed in this manner in the prior art having pattern edges which vary or deviate from the intended pattern by as much as ±5 microns. Edge variations of less than ±1 micron are ordinarily preferred for such applications. Thus, microcircuits produced using these masks have been poor in quality if not commercially useless.

SUMMARY OF THE INVENTION

It is therefore an object of the instant invention to provide a higher quality scratch and wear resistant chromium film glass based article than heretofore obtainable, and a method for making the same.

It is a further object of this instant invention to provide a method for obtaining hardened chromium film on glass having a lower incidence of pinholes and other film deformities than has heretofore been obtainable.

It is yet another object of the instant invention to provide a durable chromium filmed glass mirror of high optical quality and a method for making the same.

It is still another object of the instant invention to provide a durable chromium filmed glass based microcircuit mask having a lower incidence of film deformities therein and greater pattern edge definition than has heretofore been obtainable.

Briefly, in accordance with the instant invention, a substantially alkali-free glass substrate is provided upon which a chromium film is formed. The composite so formed is thereafter subjected to heat treatment in an oxide forming atmosphere at a temperature of at least 100° C. but less than the softening temperature of the substrate for at least a time sufficient to substantially complete the oxide forming reactions occurring on the film.

One specie of the instant invention is a mask for use in the photographic exposure of photosensitive resists and the like. Accordingly, a susbtantially alkali-free glass base, transparent with respect to photosensitive resist image developing electromagnetic energy, is provided. A chromium film is formed on the base, after which the unit is heat treated in an oxide forming atmosphere at a temperature sufficient to form an oxide interefrence film on the chromium film having a density at least sufficient to reduce the reflectivity of the composite of the two films, to the energy, to 10% of the reflectivity of the chromium film alone.

Another specie of the instant invention is a mirror wherein a substantially alkali-free optically transparent glass plate is provide. A chromium film is formed on the plate after which, the composite is heated treated in an oxide forming atmosphere at a temperature of at least 100° C., but less than the minimum temperature at which yellow oxides are formed, for at least at time sufficient to substantially complete the oxide forming reactions on the film.

Additional objects, features, and advantages of the instant invention will become apparent to those skilled in the the from the following detail description and attached drawings on which, by way of example, only the preferred embodiments of the instant invention are illustrated.

DESCRIPTION OF THE PREFERRED EMBODIMENTS

Figure 1:
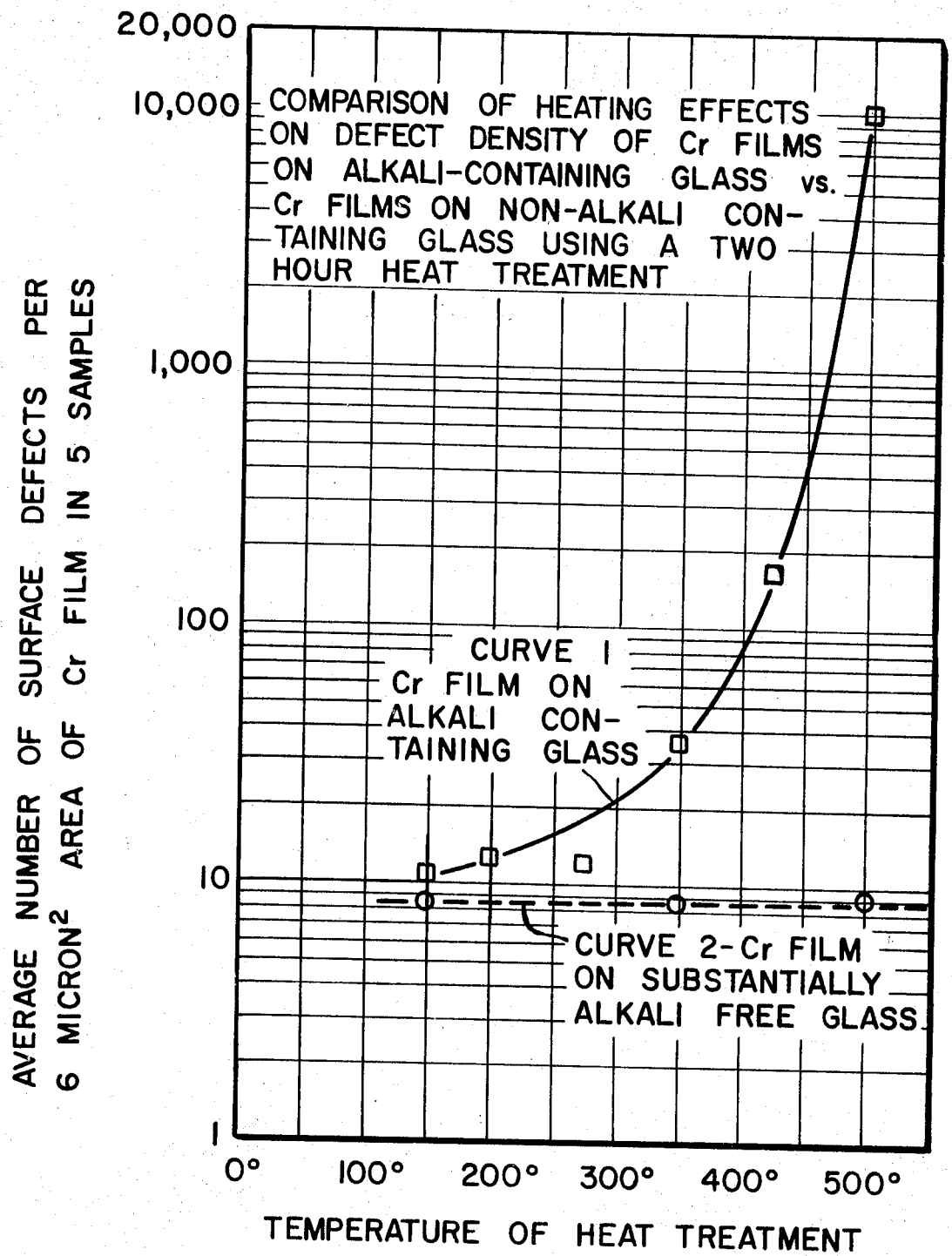
FIG. 1 illustrates, graphically, a comparison between the average surface defects occurring in five samples of chromium films on alkali containing glass bases at various heat treatment temperatures, and those occurring in five samples of chromium films of the articles of the instant invention heat treated at the same temperatures.

By the term, "soft chromium film," as used in this disclosure is meant a chromium film which is either altogether unhardened by heat, treatment, or where subjected to heat treatment, the maximum temperature employed is less than 100° C. Such films are characterized by a severe lack of resistance to wear, abrasion, scratching, and the like. Further, for heat treatments of chromium on glass at temperatures less than 100° C. there is little or no difference in film quality whether the substrate is one containing large amounts of alkali or one which is substantially free thereof. However, as the temperature of heat treatment is increased to 100° C. and above there is a striking increase in film deformations in chromium films formed on conventional glass bases as the result of such heat treatment as hereinafter more fully explained. On the other hand, there is practically no change in the number of pinholes or other deformities in the chromium films of articles heat treated in accordance with the instant invention. Thus, where heat treatment temperatures of 100° C. and higher are employed a significant difference in chromium film quality will be noted when comparisons are made between the article of the instant invention and the chromium filmed glass based articles known to the prior art.

By the terms, "KPR" and "KOR," are meant Kodak Photo Resist and Kodak Ortho Resist, respectively, which are trade name products sold by the Eastman Kodak Company, Rochester, N.Y. A complete description of these and other well known resists and the methods for using them are contained in publication P–7 entitled "Kodak Photosensitive Resists for Industry," copyrighted 1962 by the Eastman Kodak Company of Rochester, N.Y.

By the use of the terms, "substantially alkali-free glass substrate," is meant those substrates of glass material typically containing no more than about 0.25% by weight of alkali compounds as compared with the total weight of the material. The various glass compositions disclosed herein meet the above definition. However, numerous processes, well known to those skilled in the art, can be employed to remove quantities of alkali compounds from alkali containing glasses. Often, for example, it is possible to remove such compounds from surface portions of otherwise alkali containing glass substrates by careful cleaning. In such cases, alkali containing glasses are within the meaning of the term, "substantially alkali-free glass," as used in this disclosure, where the alkali compounds at or near the surface of the substrate are not greater than 0.25% by weight of the total weight of glass in that region. The region of criticality is that region near the chromium filmed surface of the substrate in which the presence of substantial quantities of alkali compounds would produce material alkali contamination of the film as a result of the particular heat treatment temperature employed. For example, at low heat treatment temperatures, the depth of the alkali free region need not be as great as where higher heat treatment temperatures are employed because, during the low temperature heat treatment, the alkali compounds in the glass below the region cannot travel as great a distance to produce contamination of the chromium as they could where the heat treatment temperature is higher.

In accordance with the instant invention, a substantially alkali-free glass substrate is provided. I have found that the use of such glasses avoids the high incidence of pinholes and other deformations which have heretofore occurred when chromium filmed, alkali-containing glass based articles are subjected to heat treatment at 100° C. and beyond. It is preferable that the glass composition chosen have thermal expansion properties which reasonably match those of chromium in the temperature range of heat treatment to be employed. This is more particularly important where high heat treatment temperatures, in the neighborhood of 250° C. and beyond are employed but may also be an important consideration at lower temperatures. Examples of suitable alkali-free glass compositions are given in the following table:

TABLE

|  | 1 | 2 | 3 |
|---|---|---|---|
| $SiO_2$ | 50 | 58 | 48 |
| $BaO$ | 25 | 6 |  |
| $Al_2O_3$ | 10 | 15 | 7 |
| $B_2O_3$ | 15 | 4 | 13 |
| $CaO$ |  | 10 |  |
| $MgO$ |  | 7 |  |
| $PbO$ |  |  | 32 |

The exact compositions listed in the table are not critical but are accurately listed to the nearest 1%. Traces of alkali compounds may also be present, not exceedingly 0.25% by weight of the total weight of each of the compositions listed.

It is preferable to prepare the glass composition selected in the well known drawn or fusion cast manner in order to obtain a reasonably flat and smooth surface upon which the chromium can be deposited as later explained. The surface of deposition of the substrate is thoroughly cleaned in any well known manner so as to substantially eliminate foreign impurities which could otherwise materially contribute to defects in the chromium film.

One suitable cleaning process which I have found to be particularly effective is as follows: First, a glass plate of one of the above compositions is formed as previously mentioned, and soaked in a common laboratory or household detergent at room temperature for five minutes or more. Next, the plate is swabbed with cotton to remove particulate matter, and thereafter subjected successively to three separate one minute rinses in distilled deionized water to eliminate water spot formations and liquidous surface acidity. Next, the plate is subjected to ultrasonic agitation in a distilled deionized water bath for about five minutes, or more. Thereafter, the plate is again rinsed in distilled deionized water to remove any surface matter which may have been collected on the plate during the foregoing ultrasonic agitation step.

The plate is blown dry with filtered clean dry air to remove water droplets and spots. A conventional vapor degreaser is thereafter used to rinse away any remaining water from the plate with isopropyl alcohol vapor. Finally, the plate is baked in clean filtered dry air for about thirty minutes or more in a temperature range between about 180° C. and 200° C. In the foregoing manner, surface contamination of the plate is substantially reduced thereby eliminating a major source of chromium film defect formation. With such a thorough cleaning, substantially all of the defects which ultimately occur in the film of the finished article will have resulted entirely from the heat treatment thereof.

A chromium film is uniformly deposited on the plate in any suitable manner such as by vacuum evaporation, electron beam deposition, sputtering, or the like. Chromium pellets having a purity of 99.999% are commercially available and suitable for evaporation into film although lesser purity chromium can be used. It should be noted however that the quality of the resulting film will ordinarily depend in part on the purity of the chromium applied to the plate. Obviously, the purer the chromium to be applied, the higher quality will be the resulting film apart from other causes of defect formation as set forth herein. Insofar as the present invention is concerned it is the suppressing of defects in the film due to the heat treatment thereof that is important. But in order to keep the defects at the lowest possible level, careful cleaning of the substrate and a clean method of film deposition thereon should be employed, for the film quality to be obtained by way of the instant invention can be no better than the film quality obtained upon completion of the film deposition.

I have obtained chromium film on alkali free glass substrates by cleaning the substrates in the above manner and depositing the film by vacuum evaporation using a starting pressure of about 2.4×10$^{-6}$ Torr in the deposition chamber, and depositing the film at a rate of from 100 to 600 A./sec. as monitored with a conventional quartz crystal monitor. In this manner soft chormium films on alkali free glass have been obtained which prior to heat treatment were virtually free of pinholes and other surface deformities. This is, of course, the best possible film condition at which to begin heat treatment in order to obtain a high quality hardened chromium film. It is reasonable to expect that such results may be obtained following the deposition of a chromium film even on alkali containing glass, especially where the substrate cleaning process has been sufficient to clear most of the alkali compounds from the surface of deposition such that subsequent heat treatment thereof at the desired temperature will not cause sufficient alkali migration through the glass to contaminate the film. It may also be necessary to eliminate the last step in the cleaning process as previously set forth, namely, the heating of the substrate to temperatures between 180 and 200° C. Since heating the substrate at these temperatures may be sufficient to cause migration of alkali compounds to the surface, the advantages gained by producing a substantially alkali free region near the surface of the substrate by careful cleaning may be lost. In any event, by using a substantially homogeneous alkali free substrate material in accordance with the instant invention such as one of those set forth in the table, no such migration can occur to an appreciable extent.

Because the heat treament of the article so formed is to a large extent dependent upon the application contemplated, the heat treatment thereof will be described in relation to two species of the instant invention.

MIRROR PREPARATION

The soft chromium filmed glass plate fabricated in accordance with the foregoing example can be formed into a high quality mirror of highly durable scratch and wear resistant quality. The unit is baked in an oxide forming atmosphere such as air at a temperature of between 100° C. and 400° C. for at least two hours, a length of time sufficient to substantially complete the oxide forming reactions. Maximum film hardness is obtained without any visible yellow oxide coloration of the film with at least a two hour heat treatment of the plate at a temperature of 375° C. Harder films may be obtained with higher heat treatment temperatures provided the yellow coloration which occurs due to thickening of the oxide formation on the film is not objectionable. In general, the higher the baking temperatures above about 375° C., the more yellowish will be the resulting tint of the chromium.

MICROCIRCUIT MASK PREPARATION

The following is one specific example of the method of forming a high quality (low pinhole density) hardened and durable microcircuit mask capable of producing improved microcircuit pattern edge definition. The glass plate previously described having a uniformly deposited soft chromium film thereon is baked in an oven in an oxide forming atmosphere such as air for at least two hours at a temperature of between 380° C. and 460° C. A hard oxide interference film, ordinarily detectable due to its yellow tint, now exists on the surface of the chromium, the advantage of which is later explained. Next, KPR is uniformly applied to the oxide surface of the film in any well known manner. The KRP may be baked onto the plate in any well known manner to improve its adherence and quality as desired. Thereafter, the KRP layer is suitably masked to avoid exposure of selected portions thereof to ultraviolet light.

A mercury vapor lamp of the type conventionally used in photoresist exposure work is employed to expose the KPR selectively through the mask. Thereafter the mask is removed and the soluble portions of the KPR are removed in a conventional KPR developer solution such as trichloroethylene, or the like. The remaining unsoluble portions of the KPR being unaffected by the developer solution remain adhered to the plate to protect the selected portions of the chromium during a following acid etching step.

The chromium microcircuit mask pattern is formed by immersing the unit so formed in any suitable chromium etchant such as a concentrated solution of sodium-hydroxide-potassium ferrocyanide, a powdered zinc-hydrochloric acid mixture, or other well known chromium etchant to remove exposed portions of the chromium film and oxide surface layer composite. After the etching action is completed the protecting KPR mask is removed leaving a high quality chromium microcircuit mask of highly durable and scratch resistant character.

Referring now to FIG. 1 there is shown a graphical comparison between the defect density occurring in chromium films on conventional alkali containing glass substrates, specifically Corning Code 0317 glass, the composition of which is obtainable from the Corning Glass Works, Corning, New York and that occurring in a chromium film on a substrate of the composition given in column 1 of the table as a function of heat treatment temperature. The data points shown represent the average pinhole density in five samples observed in a representative 6 micron² surface area of each of the films at various temperatures from 100° C. to 500° C. A curve 1 illustrates the general character of pinhole density in chromium on alkali containing glass as a function of temperature. A curve 2 is representative of the highest average pinhole density observed in the films on substantially alkali-free glass substrates. Note that the departure in average film quality as between the alkali containing glass, curve 1, and the alkali-free glass, curve 2, is noticeable at a temperature as low as about 100° C., which departure increases rapidly as the temperature of heat treatment is increased. The knee of the curve 1 occurs at about 350° C., beyond which the defect density of the chromium on the alkali containing glass substrate, the curve 1, increases at an alarming rate to an average value of about 10,000 pinholes/6 micron² surface area at a heat treatment temperature of 500° C.

Note too, that the average data points of the curve 2, the non-alkali glass substrate, do not follow a straight line as is illustrated by the curve 2 but in this particular example actually show some decreases in average pinhole density with increased heat treatment temperatures. The departures of these data points from a straight line are due to the fact that so few pinholes, less than ten per 6 micron² of surface area, exists in these films that a count of only a few pinholes difference from one sample to the next produces the departure from the curve 2 as shown. However, due to the logarithmic nature of the scale this is not a significant departure from the curve 1 which is representative of the highest average pinhole densities observed. In no case did the average pinhole density of the five samples of chromium on alkali-free glass tested at each data point temperature exceed ten per unit test area, thus indicating that not only was the defect density in these films quite low, compared with chromium on alkali containing glass, but also that the number of defects which occur is virtually independent of the magnitude of heat treatment temperature employed.

Figure 2:
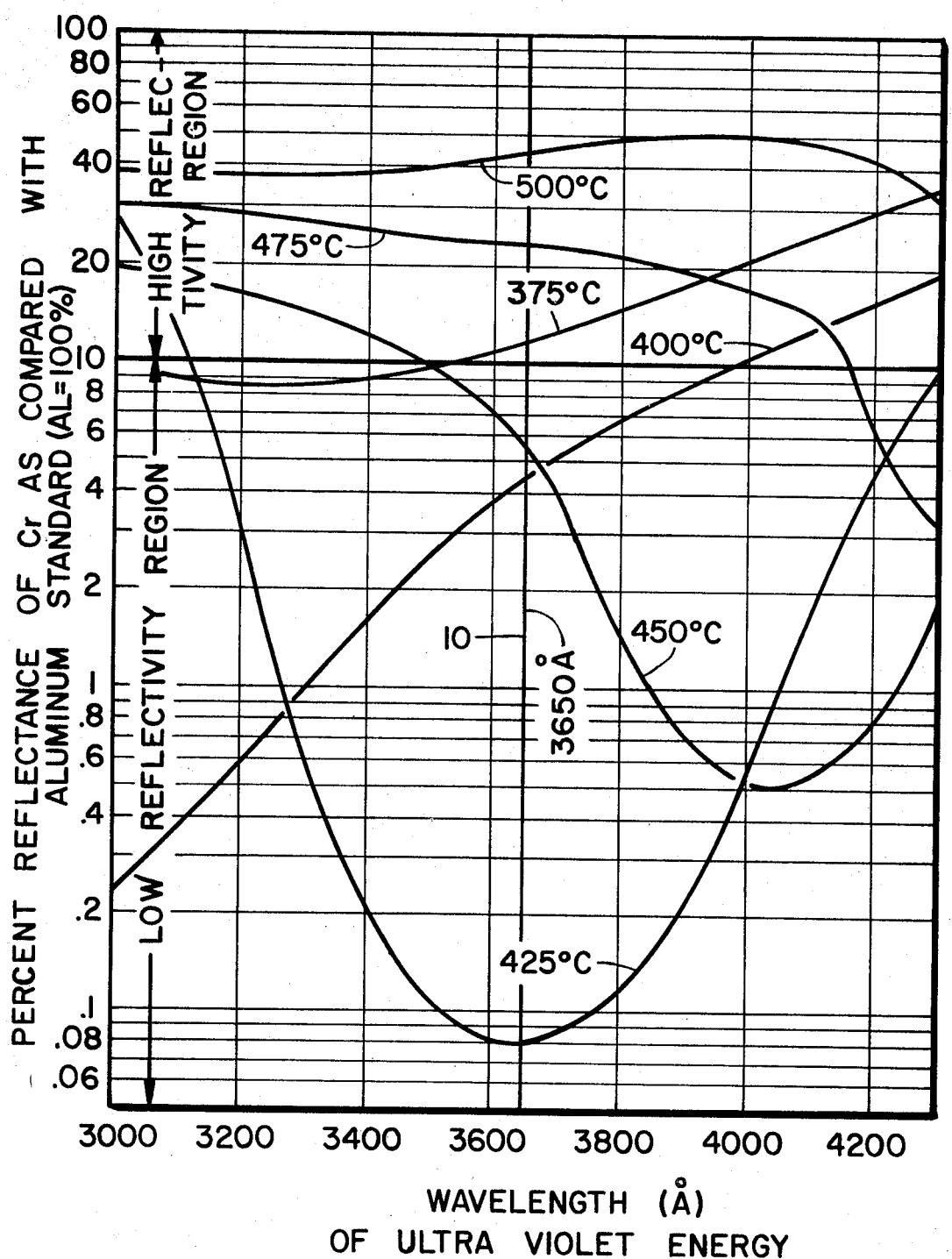
FIG. 2 illustrates, graphically, the reflectivity of chromium to various wavelengths of ultraviolet enregy compared with an aluminum film standard for a family of different heat treatment temperatures.

Referring now to FIG. 2, there is shown a family of reflectance curves for chromium films illustrating their reflectivities at various wavelengths of ultraviolet light for several different temperatures of heat treatment as compared with the reflectivity of a standard aluminum film. The principal spectral emission wavelength of a conventional mercury vapor lamp in the region for which KPR and KOR resists are most transparent, 3650° A., is illustrated by a broken line 10. For heat treatments at temperatures above about 460° C., chromium films become excellent reflectors at this wavelength, having reflectivities in excess of 10% as compared with the reflectivity of an aluminum film standard. Thus, as the temperature of heat treatment of chromium filmed glass based microcircuit masks is increased above 460° C., one can expect increasingly poorer edge definition of the resulting chromium microcircuit pattern and consequently increasingly poorer edge definition of microcircuits patterned therewith. Also, where chromium films are not heat treated, or are heat treated at less than about 380° C., the reflectivity of the chromium to 3650 A. energy is above 10% reflectance. Thus, heat treatments below this temperature also results in chromium films of high reflectance and poor edge definition. But, in the heat treatment temperature range of about 380° C. to about 460° C. the reflectance of chromium to 3650 A. energy is 10% or less of the reflectance of a standard aluminum film with the least reflectance being about 0.1% resulting from a heat treatment of about 425° C. Thus, where chromium films on alkali free glass are heat treated at temperatures from about 380° C. to about 460° C., I have found that the edge definition of chromium patterns formed using well known KPR and KOR photosensitive resist patterning techniques results in edge variations from the intended pattern of no greater than ±0.5 micron. On the other hand, the edge variations from the desired pattern occurring as a result of heat treatment at temperatures outside this range is significantly greater. By heat treating at 425° C. I have obtained chromium microcircuit mask patterns having extremely small variations from the desired pattern, namely, less than 0.1 micron. This permits an extremely high level of edge definition and pattern resolution which compares favorably with the best results presently obtainable using conventional emulsion type microcircuit masks. Also, the heat treatment of chromium films in the above-mentioned range insures an extremely hardened and durable film, thus permitting long-term use and reuse of microcircuit masks formed in accordance with this invention.

Although the instant invention has been described with respect to specific details of certain embodiments, it is not intended that such details be limitations on the instant invention except insofar as set forth in the following claims.

I claim:
1. An article of manufacture comprising
   a substantially alkali-free glass substrate, and a chromium film on said substrate having a surface hardness at least as great as that obtainable by heat treating said film at a temperature of from about 10° C. to about 460° C. for a time sufficient to substantially complete the oxide forming reactions on the surface of said film.
2. The article of claim 1 wherein said substrate comprises less than about 0.25% by weight of alkali compounds.
3. The article of claim 1 wherein said substrate is formed of material selected from the group of glasses consisting of (a) $SiO_2$, 50%; BaO, 25%; $Al_2O_3$, 10%; and $B_2O_3$, 15%; (b) $SiO_2$, 58%; BaO, 6%; $Al_2O_3$, 15%; $B_2O_3$, 4%; CaO, 10%; and MgO, 7%; and (c) $SiO_2$, 48%; $Al_2O_3$, 7%; $B_2O_3$, 13%; and PbO, 32%.
4. The article of claim 1 wherein said time is about two hours.
5. A mirror comprising
   a substantially alkali-free optically transparent glass plate, and
   a chromium film on said plate having a hardness equivalent to that obtainable by heat treating said film at a temperature of from about 100° C. to about 400° C. for a time at least sufficient to substantially complete oxide forming reactions on the surface of said film at said temperature.
6. The mirror of claim 5 wherein said plate comprises less than about 0.25% by weight of alkali compounds.
7. A method for making chromium filmed glass articles comprising the steps of providing a substantially alkali-free glass substrate, forming a chromium film on said substrate, and heat treating said film so formed at a temperature of from about 100° C. to about 460° C. for a time at least sufficient to effect the substantial completion if oxide forming reactions on the surface of said chromium film.
8. The method of claim 7 wherein said substrate comprises less than about 0.25% by weight of alkali compounds.
9. The method of claim 7 further comprising the step of cleaning the surface of said substrate prior to forming said film thereon to substantially remove foreign contaminants.
10. The method of making a mask comprising the steps of
    providing a substantially alkali-free glass base transparent to photosensitive resist image developing electromagnetic energy,
    forming a chrominum film on said base, and
    heat treating said chromium film at a temperature sufficient to form an oxide interference film on the surface thereof, said interference film having a density at least sufficient to reduce the reflectivity of the composite of said chromium and interference films to said energy to 10% of the reflectivity of a standard aluminum film.

11. The method of claim 10 wherein said energy is ultraviolet radiation at a wavelength of about 3650 A., said temperature being within the range of from about 380° C. to 460° C., and the time of heat treating said chromium film being at least sufficient in duration to permit substantial completion of oxide forming reactions at said temperature.

12. The method of claim 10 wherein said base is formed of material selected from the group of glasses consisting of (a) $SiO_2$, 50%; BaO, 25%; $Al_2O_3$, 10%; and $B_2O_3$, 15%; (b) $SiO_2$, 58%; BaO, 6%; $Al_2O_3$, 15%; $B_2O_3$, 4%; CaO, 10%; and MgO, 7%; and (c) $SiO_2$, 48%; $Al_2O_3$, 7%; $B_2O_3$, 13%; and PbO, 32%.

13. The method of claim 10 wherein said base comprises less than about 0.25% by weight of alkali compounds.

14. The method of claim 10 wherein the time for heat treating said chromium film is about two hours.

15. The method of making a mirror comprising the steps of
providing a substantially alkali-free optically transparent glass plate,
forming a chromium film on said plate, and
heat treating said film at a temperature of from about 100° C. to about 400° C. for a time sufficient to permit the substantial completion of oxide forming reactions on the surface of said film at said temperture.

16. The method of claim 15 wherein said plate comprises less than about 0.25% by weight of alkali compounds.

17. The method of claim 15 wherein said time is about two hours.

References Cited
UNITED STATES PATENTS 2,578,956  12/1951  Weinrich _____ 117—35 V
3,420,684  1/1969  Hagedorn _____ 161—196 X ALFRED L. LEAVITT, Primary Examiner
E. G. WHITBY, Assistant Examiner U.S. Cl. X.R.

117—5.5, 34, 35 V, 35 R, 93, 106 R, 124 C, 160 R; 204—192; 65—60; 355—125; 96—44; 161—196

UNITED STATES PATENT OFFICE
CERTIFICATE OF CORRECTION

Patent No. 3,647,566    Dated    March 7, 1972

Inventor(s)    Raymond E. Szupillo

It is certified that error appears in the above-identified patent and that said Letters Patent are hereby corrected as shown below:

Column 3, line 21, "interefrence" should read -- interference --; line 31, "at", second occurrence, should read -- a --; line 48, "enregy" should read -- energy --; line 56, after "heat" cancel the comma. Column 4, line 66, "exceedingly" should read -- exceeding --. Column 5, line 57, "chormium" should read -- chromium --. Column 6, lines 43 and 45, "KRP", each occurrence, should read -- KPR --. Claim 1, line 5, "10°C" should read -- 100° C. --. Claim 7, line 7, "if" should read -- of --.

Signed and sealed this 27th day of March 1973.

(SEAL)
Attest:

EDWARD M. FLETCHER, JR.    ROBERT GOTTSCHALK
Attesting Officer    Commissioner of Patents